US00RE34738E

United States Patent [19]

Brady

[11] E Patent Number: Re. 34,738

[45] Reissued Date of Patent: Sep. 27, 1994

[54] CONCEALED PORTABLE DISPLAY DEVICE FASTENER

[76] Inventor: Jack R. Brady, 910 N. Brooklyn Rd., Monroe, Utah 84754

[21] Appl. No.: 904,048

[22] Filed: Jun. 15, 1992

Related U.S. Patent Documents

Reissue of:

[64] Patent No.: 5,081,749
Issued: Jan. 21, 1992
Appl. No.: 670,315
Filed: Mar. 15, 1991

[51] Int. Cl.[5] ..... A44B 17/00

[52] U.S. Cl. ..... 24/577; 24/587; 403/119; 403/297

[58] Field of Search ..... 24/577, 576, 587, 297, 24/453; 403/405.1, 119, 297, 362; 52/71, 586; 256/26

[56] References Cited

U.S. PATENT DOCUMENTS

| | | | |
|---|---|---|---|
| 1,025,759 | 5/1912 | McCluskey | 403/362 |
| 3,696,855 | 10/1972 | Kira | 52/586 |
| 3,829,226 | 8/1974 | Kreusel | 403/297 |
| 3,847,489 | 11/1974 | Van Riper | 403/405.1 |
| 3,977,800 | 8/1976 | Cassel | 403/297 |
| 4,358,081 | 11/1982 | Notoya | 24/577 |
| 4,556,337 | 12/1985 | Marshall | 403/297 |
| 4,610,560 | 9/1986 | Miller | 403/119 |
| 4,712,336 | 12/1987 | Backer | 52/71 |
| 4,785,565 | 11/1988 | Kuffner | 52/586 |
| 4,922,678 | 5/1990 | Scheiwiller | 52/586 |
| 4,977,648 | 12/1990 | Eckerud | 24/587 |

FOREIGN PATENT DOCUMENTS

| | | | |
|---|---|---|---|
| 2065740 | 7/1981 | United Kingdom | 52/586 |

*Primary Examiner*—Victor N. Sakran
*Attorney, Agent, or Firm*—Thorpe, North & Western

[57] ABSTRACT

A concealed portable display fastener providing coupling means to assembly display devices, comprising two components, a channel interlocking means projecting outward at one end, a barb web attachment means at opposite end; A flexible clip having a plurality of semi circular open edge tubes joined perpendicular to a rectangular plate interlocking means, components when interlocked form a single fastener then conjointly mate with another fastener by a horizontal then vertical movement of clips through interlocking means permitting easy uncomplicated assembly and disassembly of devices.

37 Claims, 2 Drawing Sheets

CONCEALED PORTABLE DISPLAY DEVICE FASTENER

Matter enclosed in heavy brackets [ ] appears in the original patent but forms no part of this reissue specification; matter printed in italics indicates the additions made by reissue.

BACKGROUND

1. Field of Invention

This invention relates to a portable display device fastener used to couple display devices without use of tools or loose parts.

2. Description of Prior Art

Portable display devices include connection means comprised of fixed hinges, flexible corners, rigid barbell shaped splines and plates. The fixed hinge does not disassembly but folds upon itself causing the entire display to be handled as a single unit. This is cumbersome and weighty. Flexible and solid corners as well as spline and plate connectors have small loose parts that may become lost or damaged. Spline connectors required components to slide full length of themselves for assembly and disassembly which requires use of ladders and overhead space.

Portable display systems and devices designed in recent years, use for display surfaces, fabric rib materials to provide a full bleed surface allowing display surfaces to appear seamless. This is desirable because it does not distract the viewer from the product, message or graphics incorporated in the display.

Inventors have created a variety of connection means to provide full bleed display surfaces. U.S. Pat. No. 4,712,336 to Backer (1987) provides a full bleed system with a connection means which has many small loose parts, and is complicated to assembly or disassemble. U.S. Pat. No. 4,610,560 to Miller (1986) shows a connector means and display surface with panels exposing a frame, not full bleed, and connector plates which are not attached to display devices and merits the objections of loose parts. U.S. Pat. No. 4,823,858 to Perutz (1989) discloses a hinge system having loose parts and exposed connector means, this system folds upon itself and is handled as a unit, is complicated and requires more than one person to assemble or disassemble.

Portable display devices in addition to multiple panel display surfaces includes pedestals, towers, headers and the like. Available connector means have not provided simple assembly and disassembly procedures for these devices without the use of tools, loose parts, or accomplished by one person. This feature however is desirable for low budget market.

A variety of complicated connector means now in use in the portable display industry have not provided a low cost, lightweight, quickly assembled system without loose parts and use of any tools.

Display components and devices are often covered with fabric or other surface materials on both sides. One side having different material or color or pattern than the opposite side. This allows the possibility to interchange individual components, thus having the capability to change the configuration, and or colors or patterns and in essence having a variety of display configurations and color schemes available from a single display system.

At this time however there is no connection means available which allows any single or group of components to be individually and independently, reversed, removed, or added to, with a simple horizontal then vertical movement of display components the distance of vertical movement, being less than three inches, requiring only one individual and no tools or loose parts.

Prime concerns among user of portable display systems has been connecting means which restrict variation of configuration, colors and patterns. That are loose, cumbersome and unsightly. Seams that are apparent and at times framed by flanges, not full bleed. Tools are required to assembly or disassemble. Connection means are not attached to components and are subject to loss or damage and more than one person is required to assemble or disassemble display devices.

Full bleed display surface is a popular and desirable feature. One problem when using rib wall fabrics for display surfaces has been the nap in portable devices does not flow in the same direction, thus light reflection is varied giving display surfaces different hues and color which defeats the objects of full bleed appearance which is a continuous display surface. Connecting means current in use are not color coded or otherwise matched to overcome that problem.

The objections and disadvantages above mentioned are over come by my invention and will be apparent to those skilled in the art.

OBJECT OF THIS INVENTION IS (a) To provide a fastener that is entirely concealed when display devices are attached edge to edge.

(b) Which allows full bleed display surfaces when display devices are coupled edge to edge.

(c) That produces a tight seamless appearing joint.

(d) Comprises two components (1) a rigid keyway that receives (2) a flexible clip.

(e) That is permanently attached to display devices eliminating loose parts.

(f) Color coded clips that assures nap of fabric flows in one direction and to facilitate proper assembly.

(g) Clip that compensates for standard tolerance variations common to extrusion industry.

(h) That provides horizontal entry and exit of clip component of fastener in open end of opposing channel.

(i) That allows individual display devices to be reversed, removed, or added to, to change configuration, color, or pattern of display by a simple horizontal and vertical movement.

(j) That does not restrict or mandate the sequence of assembly or disassembly.

(k) That allows assembly and disassembly of display systems by one person.

(l) Without use of any tools for assembly or disassembly of system.

REFERRING NOW IN DETAIL TO THE DRAWINGS

Figure 1:
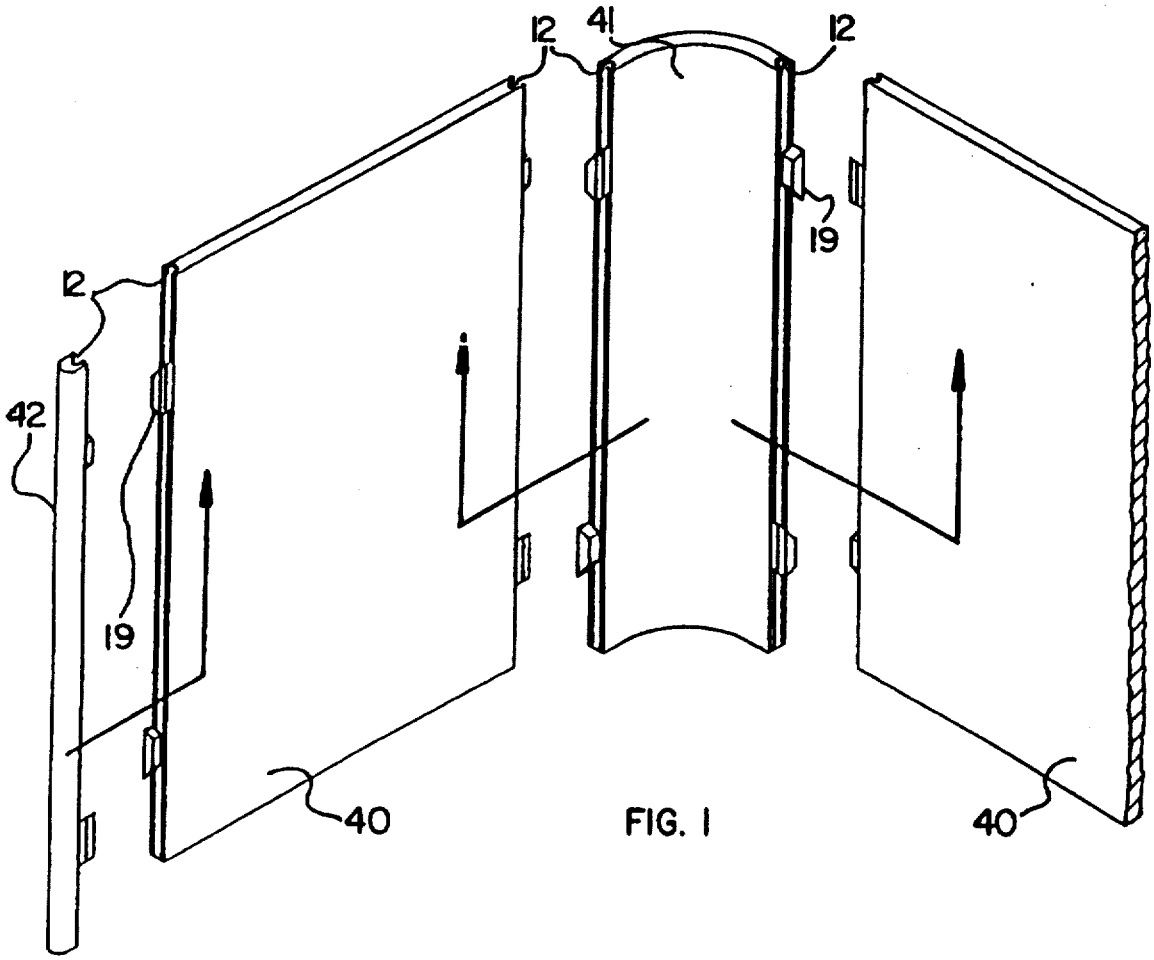
FIG. 1 is a perspective view of display devices is a disassembled mode illustrating exposed fasteners prior to assembly.

FIG. 1 shows the preferred embodiment of this invention. Integrating components of portable display devices including panels 40, flexible corner 41, edge cover 42. Assembly of display devices is accomplished when color code flexible clips 19 are inserted in open end slot 12 with a horizontal movement then a vertical movement. Clips 19 are mated and interlock in opposing channels forming a rigid coupling.

Figure 2:
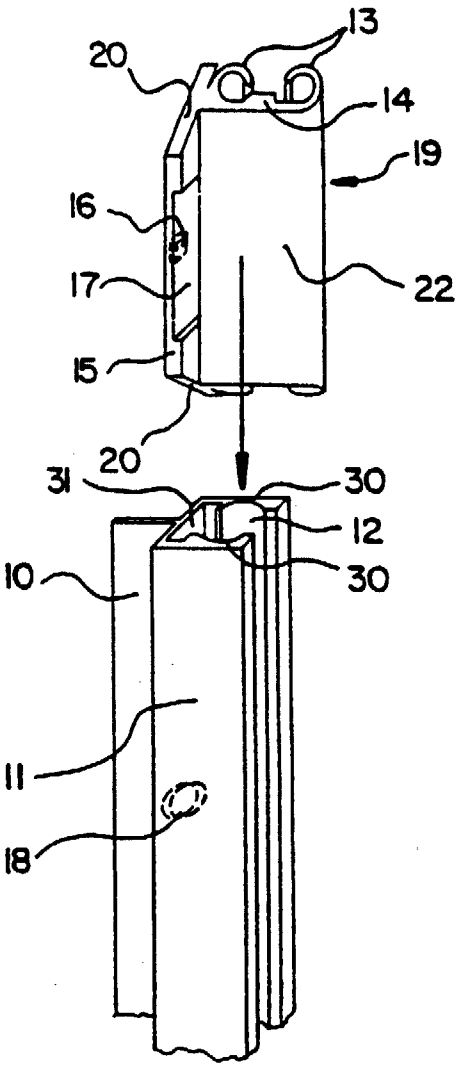
FIG. 2 is an isometric view showing channel and clip components of fastener prior to assembly.

FIG. 2 shows in detail the two components 11, 19 of this invention which provides a fastener that becomes permanently integrated to display devices. This eliminates small or loose parts that are easily lost or damaged. Elongate channel 11 is extruded from metal or plastic and sized to accommodate thickness of display devices. Channel 11 is fastened to display devices via barb web 10 inserted in groove of devices. Inside surface 30, of opposing sides of channel 11 creates a configuration which receives clip 10. Inside surfaces 30 receives semi circular open edge tubes 13. Inside configuration forms a breech 31 which receives rectangular plate 15. Channel 11 includes a round depression 18 sized to receive cube boss 16 on plate 154. Color code flexible clip 19 is inserted in top of channel 11 by flexing plate 15 at slot 17 allowing clip 19 to slide into channel 11 until boss 16 interlocks with depression 18 causing clip 19 to be permanently attached to channel 11. Components 11, 19 unite as a single fastener.

Clip 19 contains a plurality of semi circular open edge tubes of equal length 13, connected by fillet 14 of same length. A rectangular plate 15 connected perpendicular at longitudinal center forming a T shape. Plate 15 contains a slot 17 at center. Outside surface of plate 15 contains a cube boss 16 with side dimensions equal to depth dimension of slot 17. Top and bottom of clip 19 is molded to form a slope 20. This improves mating capability of fastener when display devices are coupled, said clip 19 inserted into channel 11. Fillet 14 is sized to fill one half space of slot 12.

Clip 19 contains a flat surface 22 that locates adjacent to flat surface 22 of a mated clip. The combined bulk of fillets 14 of mated clips fills the space of slot 12 of channels 11 providing alignment of channels.

Figure 3:
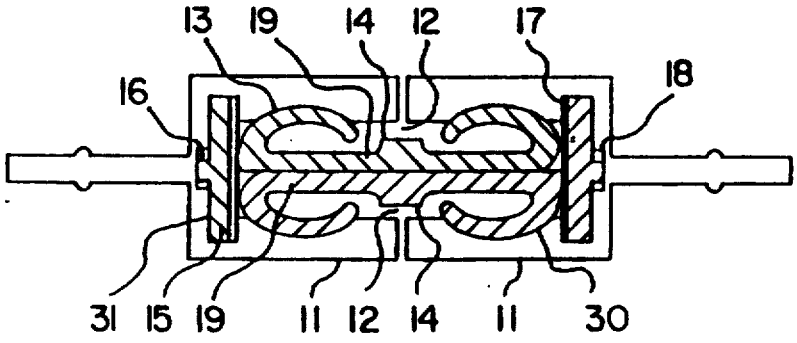
FIG. 3 is a cross sectional view of a mated pair of fasteners.

FIG. 3 is a cross sectional view of a mated pair of fasteners illustrating two independent fasteners. When a pair of fasteners mate a coupling is accomplished that provides a rigid connection. This view demonstrates how breech 31 receives plate 15 of clip 19. The necessity of slot 17 in plate 15 becomes obvious, it allows flexion of plate 15 to provide clearance for boss 16 in breech 31. When clip 19 is moved into position boss 16 is received by depression 18. Flexion of plate 15 interlocks clip 19 and channel 11. Clip 19 is now permanently attached to channel 11 and a single fastener is created.

This view also illustrates that rigid connection and alignment is accomplished by friction provided by flexion capability of tubes 13 as they conform to surface 30. This compensates for tolerance variations common to extrusion industry standards. Without this capability tight joints and alignment would not be accomplished. The combined bulk of fillet 14 fills the space in slot 12 aligning surfaces of channel 11.

Figure 4:
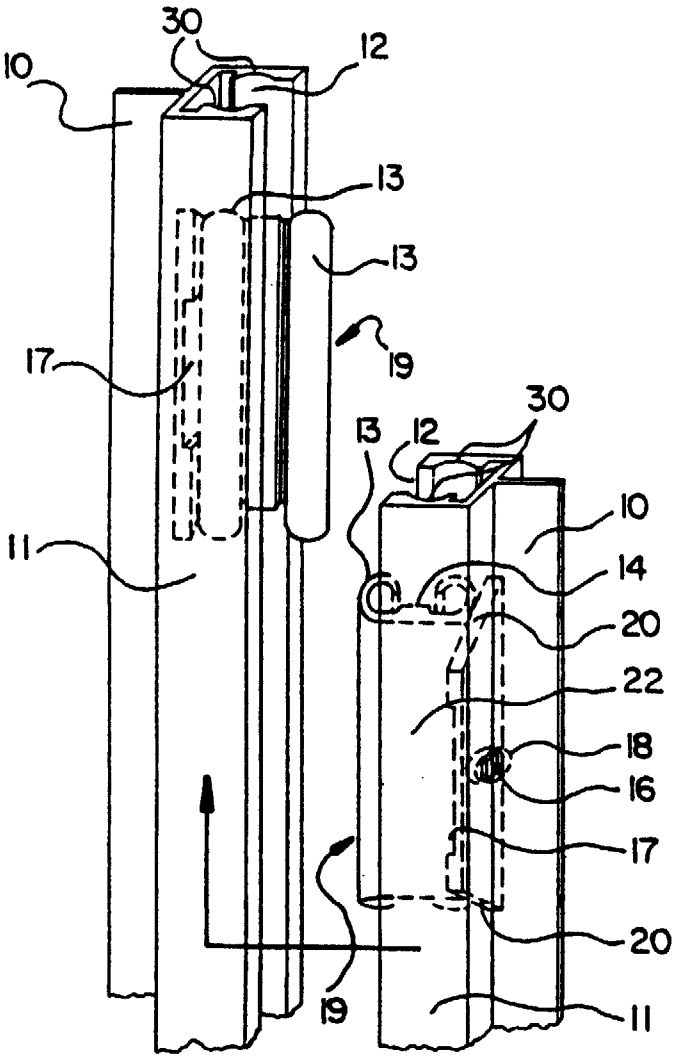
FIG. 4 is a perspective view of a pair of fasteners prior to mated mode.

FIG. 4 is a perspective view of a pair of fasteners prior to coupling. Each fastener is comprised of two components. An extruded channel 11, a molded flexible color coded clip 109. Clip 19 permanently interlocked to channel 11 by friction provided by flexion of clip 19. Coupling of a pair of fasteners is accomplished when a pair of fasteners address each other and protruding tube 13 of each fastener, enters slot 12 of opposing fastener by a horizontal movement. Fillet 14 is sized to fill one half space of slot 12. The combined bulk of fillets 14 of mated clips fills the space of slot 12 of channels 11 providing alignment of channels. The fasteners are coupled by sliding together in a vertical movement until clips 19 are side by side. This causes tubes 13 to compress against inside surfaces 30 of channel 11, and flat surfaces 22 of clips 19. The vertical movement is aided by slope 20 molded in clip 19. The coupling is effective by friction making ti simple to assemble or disassemble display devices without use of tools or loose parts. The vertical movement is minimal, simply the distance equal to the length of clip 19.

This minimal movement allows display devices to be disconnected at any joint which allows versatility of display surface configuration, change of color or patterns. A concealed fastener that provides full bleed display surface. These advantages and others will become obvious to those familiar with the art.

What I claim:

1. A concealed portable display device fastener permanently attached to device components comprising:
   - A. An elongate channel having a barb web attachment means at one end, an open end keyway including a round depression interlocking means at opposite end.
   - B. A clip having a plurality of flexible semi circular open edge tube of equal length interlocking means attached to a fillet of same length at one end, a rectangular plate interlocking means of same length fastened perpendicular at longitudinal center forming a T shape at opposite end, outside face of said plate having cube boss interlocking means with dimensions of sides equal to depth of a slot flexion means in said plate, said slot flexion means located at center of said plate, said boss interlocking means with said depression in said channel preventing longitudinal movement of said clip, said clip hereby inserted in top of channel by interlocking means becomes permanently attached to said channel creating a single fastener, said fastener attaches to display devices via said barb web connection means; a pair of fasteners coupling means occurs as said tube flexion means permits said tubes to conform to contour of said keyway interlocking means accomplishing tight rigid connection means.

2. A fastener as in claim 1 wherein said channel configuration comprises three sides with flat outside surfaces, opposing sides with curved inside surfaces.

3. A fastener as in claim 2 wherein said channel with a rectangular breech contiguous to flat side connection means said two opposing sides of channel.

4. A fastener as in claim 3 wherein said channel includes a depression interlocking means on inside surface of said rectangular breech.

5. A fastener as in claim 2 wherein said opposing sides with curved inside surfaces forms a lip on each side reducing size of a slot interlocking means of said keyway.

6. A fastener as in claim 1 wherein said clip is molded of flexible material such as polyethylene or polyproplene but not confined to these materials.

7. A fastener as in claim 6 wherein said clip include a plurality of semi circular open edge tubes flexion means with curved outside surfaces sized to pass through said slot interlocking means of said channel.

8. A fastener as in claim 6 wherein top and bottom of said clip is molded with a slope.

9. A fastener as in claim 7 wherein said tubes flexion means nest in said keyway by conforming to contour of curved surface of said keyway interlocking means.

10. A fastener as in claim 1 wherein said fillet is sized to fill one half of space of said slot of keyway.

11. A fastener as in claim 1 wherein said clip includes a rectangular plate molded perpendicular to said tube at longitudinal center.

12. A fastener as in claim 11 wherein said plate is sized to fit in said breech.

13. A fastener as in claim 12 wherein outside face of said plate contains a cube boss interlocking means with dimensions equal to depth of said slot in center of said plate.

14. A fastener as in claim 11 wherein said plate includes a slot flexion means at center of said plate.

15. A fastener as in claim 1 wherein said plate flexion means allows said clip to be inserted into said breech, said boss interlocks with said depression in said channel.

16. A fastener as in claim 1 wherein said clip when inserted in said channel becomes permanently attached by interlocking means thus said clip and said channel constitute a single fastener.

17. A fastener as in claim 1 wherein a pair of said fasteners are coupled as said clip enters horizontally through opposing said slot means of said channels then slides coupling means vertically.

18. A fastener as in claim 17 wherein said fastener is concealed when display devices are coupled.

19. A fastener as in claim 1 wherein said clips are color code.

20. A fastener as in claim 1 wherein said fastener becomes integral, by connection means, to display device.

*21. A fastener for coupling panels together comprising*

*an elongate channel including on one side, means for attaching the channel to an edge of a panel, and on another side, an open end keyway enlarged inside the opening, and a breech formed in communication with the keyway,*

*clip means having a flexible enlargement at one end for snugly fitting within the enlarged portion of a keyway of a channel, and a plate means at the opposite end generally forming a T shape for fitting within a breech of a different channel, the plate means having a configuration such that the plate means is securely held in the breech as force directed away from the breech is applied to the clip means, and*

*means for securing the plate means in place in the breech of a channel,*

*wherein two channels can receive, when positioned together with facing keyways, the clip means disposed in the channels with the flexible enlargement in an enlarged portion of a keyway of one of the channels, and with plate means in a breech of the other of the channels, such that the two channels are held together.*

*22. A fastener as in claim 21 wherein the attaching means comprises a barb web projecting from said one side of the channel.*

*23. A fastener as in claim 21 wherein the enlargement of the clip means comprises a flexible rounded open edge tube adapted to the enlarged portion of the keyway.*

*24. A fastener as in claim 23 wherein said clip means further comprises a fillet extending generally perpendicularly from the plate means to the open edge tube to join the tube to the plate means so that when the plate means is disposed in the breech of one channel, the fillet extends through the keyway of the one channel and into the keyway of an adjacent channel where the tube is disposed in the enlarged portion of the adjacent channel.*

*25. A fastener as in claim 24 wherein said clip means further comprises a second flexible rounded open edge tube formed on the fillet adjacent to the plate means and spaced from the first-mentioned tube, said second tube fitting snugly within the enlarged portion of the keyway of the same channel in whose breech the plate means is disposed.*

*26. A fastener as in claim 25 wherein the fillet extends generally linearly from the plate means, and wherein the two open edge tubes are formed on the same side of the fillet at spaced-apart locations, to occupy about one-half of the space of the enlarged portions of the keyways of two channels when the clip means is disposed in the two channels.*

*27. A fastener s in claim 21 wherein said securing means comprises*

*boss means extending from the plate means, and*

*a depression formed in the breech to receive the boss means when the plate means is disposed in the breech.*

*28. A fastener as in claim 21 wherein the keyway of the channel is formed to have a generally rectangular cross-section, open at one end, and concave opposing side walls at each side of the opening.*

*29. A fastener as in claim 28 wherein the breech of the channel is formed to have a generally rectangular cross-section extending wider than the width of the keyway for holding the plate means when disposed in the breech.*

*30. A fastener as in claim 21 wherein said clip means is made of flexible material selected from the group consisting of polyethylene and polypropylene.*

*31. A fastener as in claim 21 wherein the top and bottom of the clip means are formed with sloping surfaces to allow sliding of the clip means into one end of the channel.*

*32. A fastener for coupling two display devices together comprising*

*first and second means, each defining an elongate channel having a bottom wall, two side walls, and an opening opposite the bottom wall, wherein the width of the channel adjacent the bottom wall is enlarged to define a breech, and wherein the width of the channel between the opening and the breech is enlarged to define a keyway, each of said channels defining means further including means for attaching the first and second means to respective display devices, and*

*first and second clips, each including*

*plate means for insertion into the breech of a respective channel defining means, the plate means having a configuration such that the plate means is securely held in the respective breech as force directed away from the respective breech is applied to the first and second clips,*

*fillet means extending from the plate means outwardly from one side thereof so that when the plate means is inserted in the breech of the respective channel defining means, the fillet means extends outwardly through the channel of the respective channel defining means and into the channel of the other channel defining means positioned adjacent to the respective channel defining means, and*

*a first flexible clip element extending from the free end of the fillet means laterally and rearwardly toward the*

*plate means, to generally conform and fit within the of said other channel defining means when the first and second channel defining means are in a channel to channel facing relationship such that the fillet means of each clip extends side-by-side from one channel to the other and the first clip element of each clip is disposed in the keyway of a different channel defining means to thereby couple the first and second channel defining means together.*

*33. A fastener as in claim 32 wherein the keyway enlargement of each channel comprises concave sidewall adjacent the channel opening, and wherein the first element of each clip is shaped to fit snugly against the concave side sidewall of a channel.*

*34. A fastener as in claim 33 wherein said first clip element comprises a flexible element extending from the free end of the fillet means laterally and rearwardly toward the plate means to generally conform with the concave sidewall of said other channel.*

*35. A fastener as in claim 34 wherein each clip further includes a second flexible clip element extending from the fillet means from a location adjacent the plate means laterally and forwardly toward the first clip element.*

*36. A fastener for coupling panels together comprising*

*an elongate channel including on one side, means for attaching the channel to an edge of a panel, and on another side, an open end keyway enlarged inside the opening, and a breech formed in communication with the keyway,*

*clip means having a flexible enlargement at one end for snugly fitting within the enlarged portion of a keyway of a channel, the enlargement comprising a flexible rounded first open edge tube adapted to fit snugly within the enlarged portion of the keyway, and a plate means at the opposite end generally forming a T shape for fitting within a breech of a different channel, the clip means comprising a fillet extending generally perpendicularly from the plate means to the first open edge tube to join the first tube to the plate means so that when the plate means is disposed in the breech of one channel, the fillet extends through the keyway of the one channel and into the keyway of an adjacent channel where the first tube is disposed in the enlarged portion of the adjacent channel and further comprising a second flexible rounded open edge tube formed on the fillet adjacent to the plate means and spaced from the first tube, said second tube fitting snugly within the enlarged portion of the keyway of the same channel in whose breech the plate means is disposed, and*

*means for securing the plate means in place in the breech of a channel.*

*wherein two channels may be positioned together, with facing keyways, such that a clip means may be disposed with the flexible enlargement in an enlarged portion of a keyway of one of the channels, and with plate means in a breech of the other of the channels.*

*37. A fastener for coupling two display devices together comprising*

*first and second means, each defining an elongate channel having a bottom wall, two side walls, and an opening opposite the bottom wall, wherein the width of the channel adjacent the bottom wall is enlarged to define a breech, and wherein the width of the channel between the opening and the breech is enlarged to define a keyway, each of said channel defining means further including means for attaching the first and second means to respective display devices, and*

*first and second clips, each including*

*plate means for insertion into the breech of a respective channel defining means,*

*fillet means extending from the plate means outwardly from one side thereof so that when the plate means is inserted in the breech of the respective channel defining means, the fillet means extends outwardly through the channel of the respective channel defining means and into the channel of the other channel defining means positioned adjacent to the respective channel defining means,*

*a first flexible clip element disposed to extend laterally from the free end of the fillet means to generally conform and fit within the keyway of said other channel defining means when the first and second channel defining means are in a channel to channel facing relationship, such that the fillet means of each clip extends side-by-side from one channel to the other and the first clip element of each clip is disposed in the keyway of a different channel defining means to thereby couple the first and second channel defining means together,*

*a second flexible clip element extending from the fillet means laterally and rearwardly toward the plate means to generally conform with the concave sidewall of said other channel to also thereby couple the first and second channel defining means together, and*

*second flexible clip element extending from the fillet means from a location adjacent the plate means laterally and forwardly toward the first clip element.*

* * * * *